(12) United States Patent
Hunt et al.

(10) Patent No.: US 10,781,868 B2
(45) Date of Patent: Sep. 22, 2020

(54) CONTROLLABLE ONE-WAY CLUTCH

(71) Applicant: Schaeffler Technologies AG & Co. KG, Herzogenaurach (DE)

(72) Inventors: Kenneth Hunt, Wooster, OH (US); David Smith, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 124 days.

(21) Appl. No.: 16/136,392

(22) Filed: Sep. 20, 2018

(65) Prior Publication Data

US 2020/0096058 A1    Mar. 26, 2020

(51) Int. Cl.
*F16D 41/066*    (2006.01)
*F16D 23/12*    (2006.01)
*F16D 41/08*    (2006.01)

(52) U.S. Cl.
CPC ........... *F16D 41/066* (2013.01); *F16D 23/12* (2013.01); *F16D 41/08* (2013.01); *F16D 2023/123* (2013.01)

(58) Field of Classification Search
None
See application file for complete search history.

(56) References Cited

U.S. PATENT DOCUMENTS

| | | | |
|---|---|---|---|
| 5,971,123 A | 10/1999 | Ochab et al. | |
| RE38,012 E | 3/2003 | Ochab et al. | |
| 6,622,837 B2 | 9/2003 | Ochab et al. | |
| 6,629,590 B2 | 10/2003 | Ochab et al. | |
| 6,722,484 B2 | 4/2004 | Ochab et al. | |
| 7,588,112 B2 * | 9/2009 | Ebihara | F16D 41/088 180/248 |
| 8,840,514 B1 | 9/2014 | Knickerbocker et al. | |
| 8,857,294 B2 | 10/2014 | Brewer et al. | |
| 8,857,589 B2 | 10/2014 | Heath et al. | |
| 8,919,513 B2 | 12/2014 | Heath et al. | |
| 9,022,195 B2 | 5/2015 | Heath et al. | |
| 9,360,059 B2 | 6/2016 | Palmer et al. | |
| 2002/0125095 A1 | 9/2002 | Ochab et al. | |

(Continued)

FOREIGN PATENT DOCUMENTS

WO        0240891 A2    5/2002
WO    2004031597 A1    4/2004

(Continued)

*Primary Examiner* — Mark A Manley (57) ABSTRACT

A one-way clutch, including: pocket and inner rings; rollers between the rings; springs urging the rollers in a first circumferential direction; a switch ring including protrusions in contact with the rollers and having ramps. In a one-way configuration: the inner and pocket rings non-rotatably connect for relative rotation of the inner ring, with respect to the pocket ring, in the first circumferential direction; and for a free-wheel mode, the inner ring is rotatable in a second circumferential direction with respect to the pocket ring. In an open configuration: the inner and pocket rings are independently rotatable. To transition from the one-way clutch configuration to the open configuration: the actuator axially displaces the switch ring with respect to the pocket ring; the ramps slide along the pocket ring to rotate the switch ring in the second circumferential direction; and the protrusions displace the rollers in the second circumferential direction.

20 Claims, 8 Drawing Sheets

(56) References Cited

U.S. PATENT DOCUMENTS

| | | |
|---|---|---|
| 2002/0125097 A1 | 9/2002 | Ochab et al. |
| 2003/0089570 A1 | 5/2003 | Ochab et al. |
| 2012/0152686 A1* | 6/2012 | Brewer .................. F16D 27/10 192/84.1 |
| 2013/0112520 A1 | 5/2013 | Heath et al. |
| 2013/0134006 A1 | 5/2013 | Heath et al. |
| 2013/0199886 A1 | 8/2013 | Heath et al. |
| 2014/0274530 A1 | 9/2014 | Knickerbocker et al. |
| 2015/0075936 A1* | 3/2015 | Akiyoshi .............. F16D 41/105 192/45.004 |
| 2015/0159743 A1 | 6/2015 | Palmer et al. |
| 2017/0045099 A1* | 2/2017 | Peet ...................... F16D 41/066 |
| 2017/0122385 A1* | 5/2017 | Aramoto ............... F16D 41/066 |
| 2018/0216676 A1 | 8/2018 | Geiser et al. |
| 2018/0231071 A1 | 8/2018 | Geiser et al. |

FOREIGN PATENT DOCUMENTS

| | | |
|---|---|---|
| WO | 2013082168 A1 | 6/2013 |
| WO | 2014143090 A1 | 9/2014 |
| WO | 2014159651 A1 | 10/2014 |

* cited by examiner

CONTROLLABLE ONE-WAY CLUTCH

TECHNICAL FIELD

The present disclosure relates to controllable one-way clutch with a selectable open configuration in which the one-way clutch can free-wheel in each circumferential directions.

BACKGROUND

It is desirable for a one-way clutch to have an option to free-wheel in each circumferential direction.

SUMMARY

According to aspects illustrated herein, there is provided a one-way clutch, including: an axis of rotation; a pocket ring; an inner ring; a plurality of rollers radially disposed between the inner ring and the pocket ring; a plurality of springs urging the plurality of rollers in a first circumferential direction; a switch ring including a plurality of axially extending switching protrusions, each axially extending switching protrusion in contact with a respective roller and including a respective ramp in contact with the pocket ring; and an actuator. In a one-way clutch configuration of the one-way clutch: for a locked mode, the inner ring non-rotatably connects to the pocket ring for relative rotation of the inner ring, with respect to the pocket ring, in the first circumferential direction; and for a free-wheel mode the inner ring is rotatable with respect to the pocket ring in a second circumferential direction, opposite the first circumferential direction, or the pocket ring is rotatable with respect to the inner ring in the first circumferential direction. In an open configuration of the one-way clutch: the inner ring is rotatable, with respect to the pocket ring, in the first circumferential direction and in the second circumferential direction; or the pocket ring is rotatable, with respect to the inner ring, in the first circumferential direction and in the second circumferential direction. To transition from the one-way clutch configuration to the open configuration: the actuator is arranged to axially displace the switch ring with respect to the pocket ring; the respective ramps are arranged to slide along the pocket ring to rotate the switch ring in the second circumferential direction; and the plurality of axially extending switching protrusions is arranged to displace the plurality of rollers in the second circumferential direction.

According to aspects illustrated herein, there is provided a one-way clutch, including: an axis of rotation; a pocket ring; an inner ring; a plurality of rollers radially disposed between the inner ring and the pocket ring; a plurality of springs urging the plurality of rollers in a first circumferential direction; a switch ring including a plurality of first switching protrusions extending in a first axial direction, each first switching protrusion in contact with a respective roller and including a respective ramp in contact with the pocket ring; a first actuator; and a second actuator. In a one-clutch configuration of the one-way clutch: for a locked mode, the inner ring non-rotatably connects to the pocket ring for relative rotation of the inner ring, with respect to the pocket ring, in the first circumferential direction; and for a free-wheel mode the inner ring is rotatable with respect to the pocket ring in a second circumferential direction, opposite the first circumferential direction, or the pocket ring is rotatable with respect to the inner ring in the first circumferential direction. In an open configuration of the one-way clutch: the inner ring is rotatable, with respect to the pocket ring, in the first circumferential direction and in the second circumferential direction; or the pocket ring is rotatable, with respect to the inner ring, in the first circumferential direction and in the second circumferential direction. To transition from the one-way clutch configuration to the open configuration: the first actuator is arranged to displace the switch ring, with respect to the pocket ring, in the first axial direction; the respective ramps are arranged to slide along the pocket ring to rotate the switch ring in the second circumferential direction; and the plurality of axially extending switching protrusions is arranged to displace the plurality of rollers in the second circumferential direction. To transition from the open configuration to the one-way clutch configuration, the second actuator is arranged to displace the switch ring, with respect to the pocket ring, in a second axial direction opposite the first axial direction.

According to aspects illustrated herein, there is provided a one-way clutch, including: an axis of rotation; a pocket ring; an inner ring; a plurality of rollers radially disposed between the inner ring and the pocket ring; a plurality of springs urging the plurality of rollers in a first circumferential direction; a switch ring including a plurality of switching protrusions extending in a first axial direction, each switching protrusion in contact with a respective roller and including a respective ramp in contact with the pocket ring; a resilient element; and an electromagnetic actuator. In a one-way clutch configuration of the one-way clutch: for a locked mode, the inner ring non-rotatably connects to the pocket ring for relative rotation of the inner ring, with respect to the pocket ring, in the first circumferential direction; and for a free-wheel mode the inner ring is rotatable with respect to the pocket ring in a second circumferential direction, opposite the first circumferential direction, or the pocket ring is rotatable with respect to the inner ring in the first circumferential direction. In an open configuration of the one-way clutch: the inner ring is rotatable, with respect to the pocket ring, in the first circumferential direction and in the second circumferential direction; or the pocket ring is rotatable, with respect to the inner ring, in the first circumferential direction and in the second circumferential direction. To transition from the one-way clutch configuration to the open configuration: the electromagnetic actuator is arranged to displace the switch ring, with respect to the pocket ring, in the first axial direction; the respective ramps are arranged to slide along the pocket ring to rotate the switch ring in the second circumferential direction; and the plurality of first switching protrusions is arranged to displace the plurality of rollers in the second circumferential direction. To transition from the open configuration to the one-way clutch configuration the resilient element is arranged to displace the switch ring, with respect to the pocket ring, in a second axial direction opposite the first axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 8:
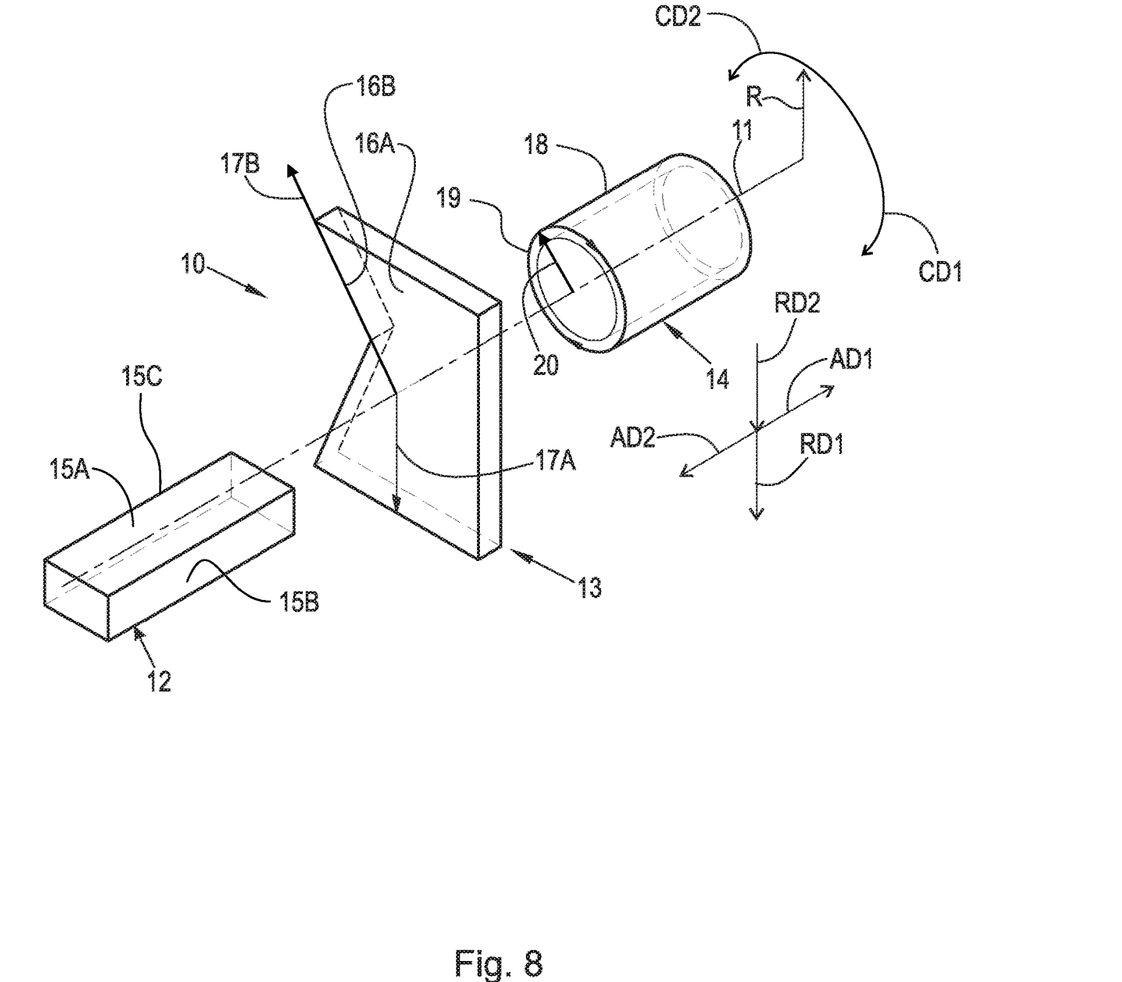

FIG. 8 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11*j* rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
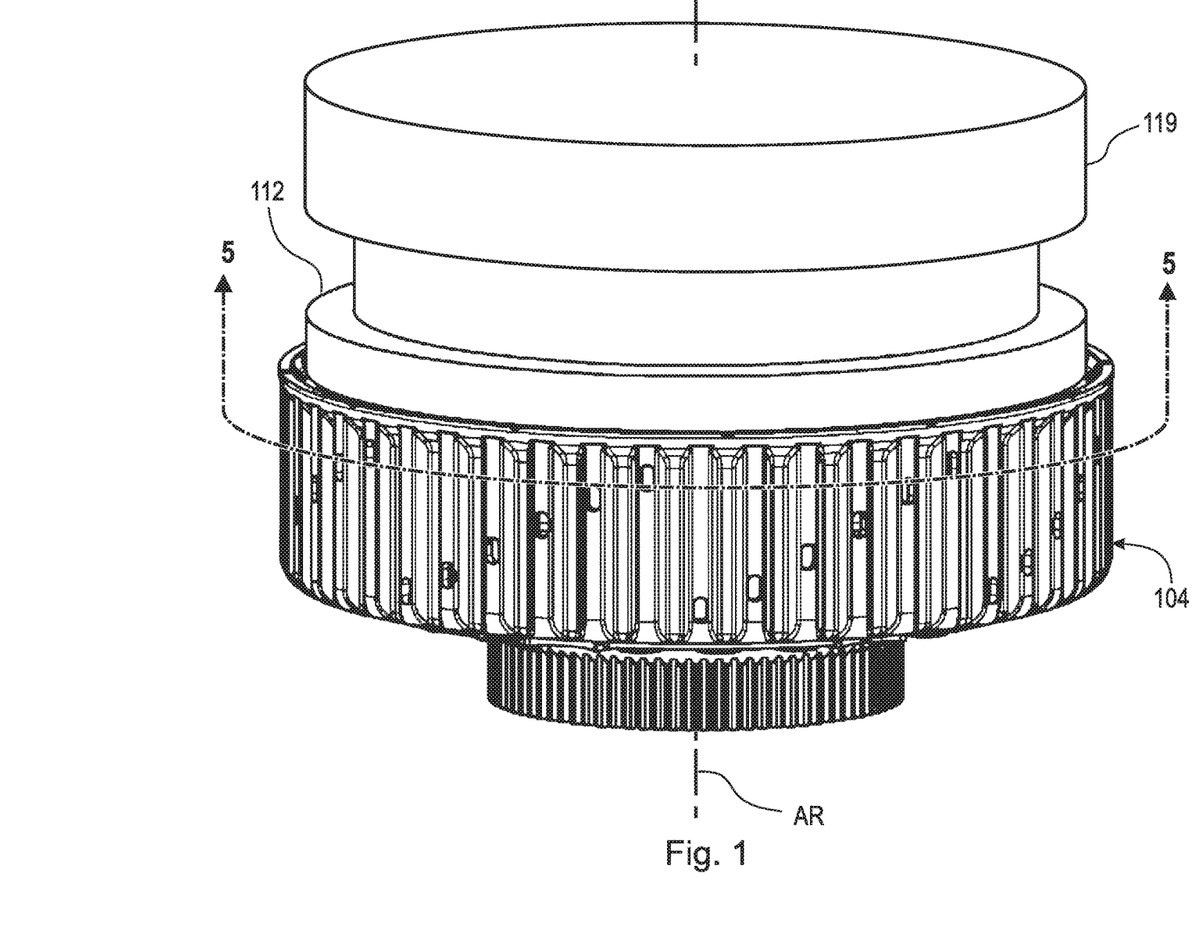
FIG. 1 is a side perspective view of a controllable one-way clutch.

FIG. 1 is a side perspective view of controllable one-way clutch 100.

Figure 2:
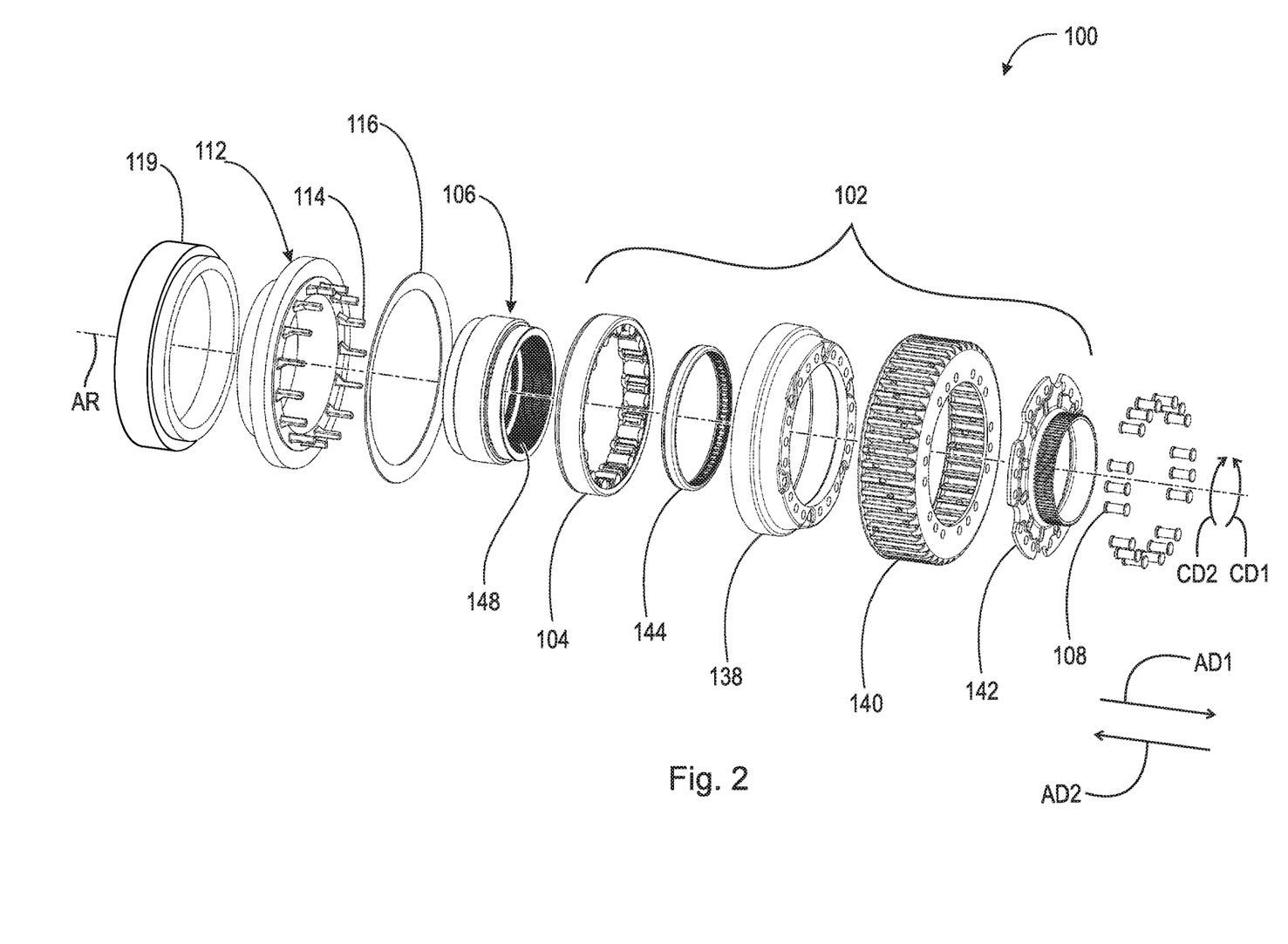
FIG. 2 is an exploded view of the controllable one-way clutch shown in FIG. 1.

FIG. 2 is an exploded view of controllable one-way clutch 100 shown in FIG. 1.

Figure 3:
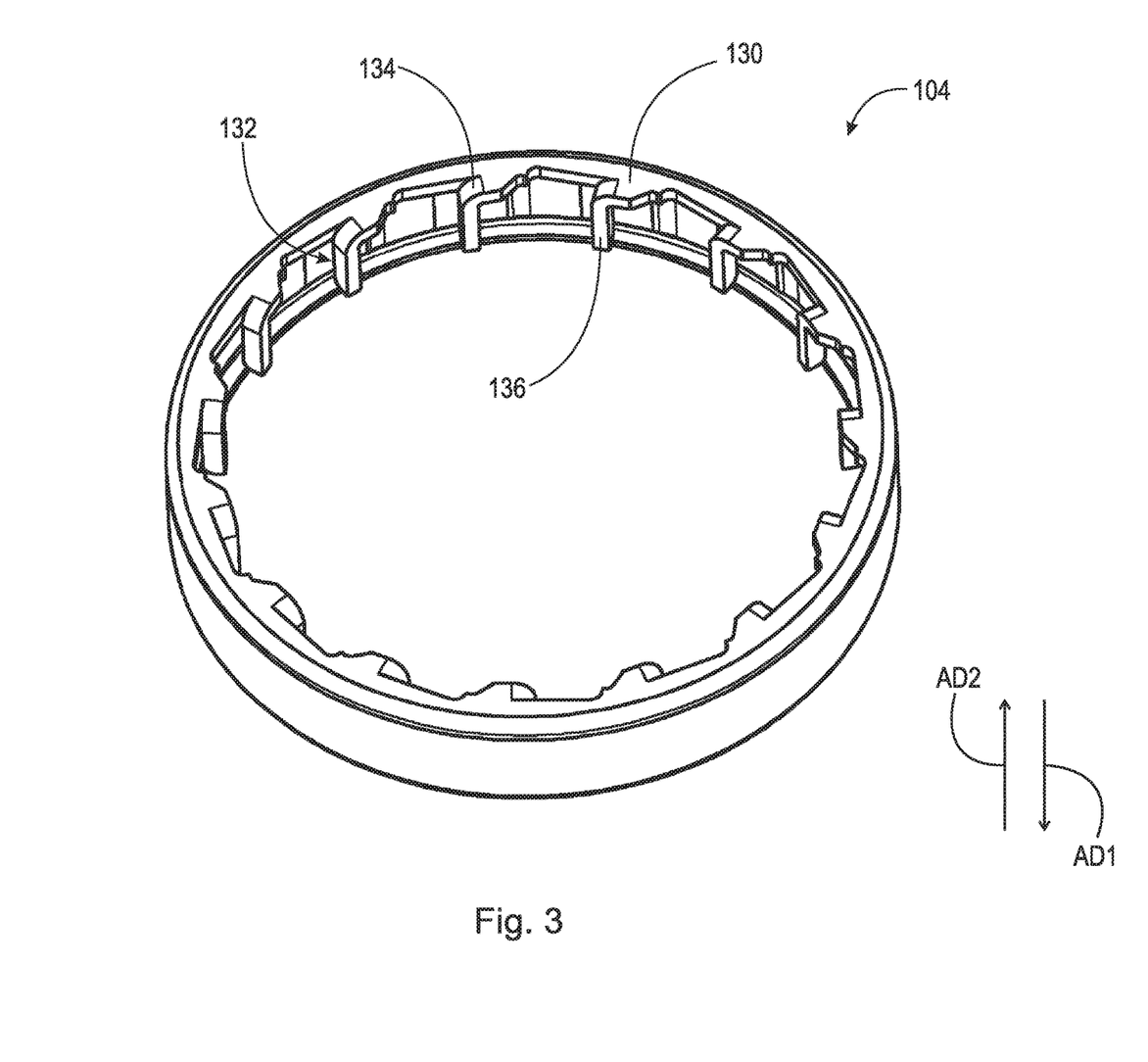
FIG. 3 is a perspective view of a pocket ring for the controllable one-way clutch shown in FIG. 1.

FIG. 3 is a perspective view of a pocket ring for controllable one-way clutch 100 shown in FIG. 1.

Figure 4:
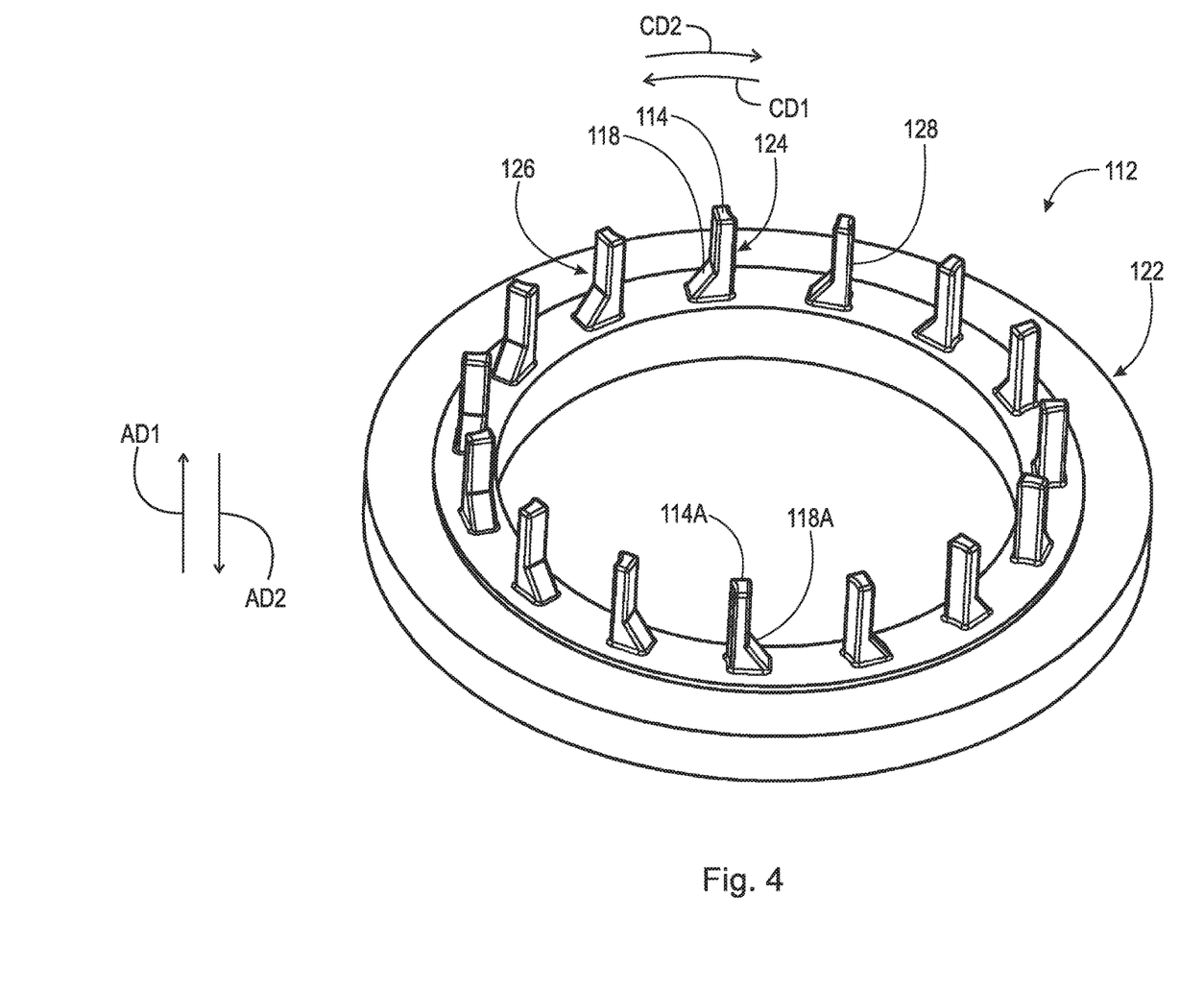
FIG. 4 is a perspective view of a switch ring for the controllable one-way clutch shown in FIG. 1.

FIG. 4 is a perspective view of a switch ring for controllable one-way clutch 100 shown in FIG. 1.

Figure 5:
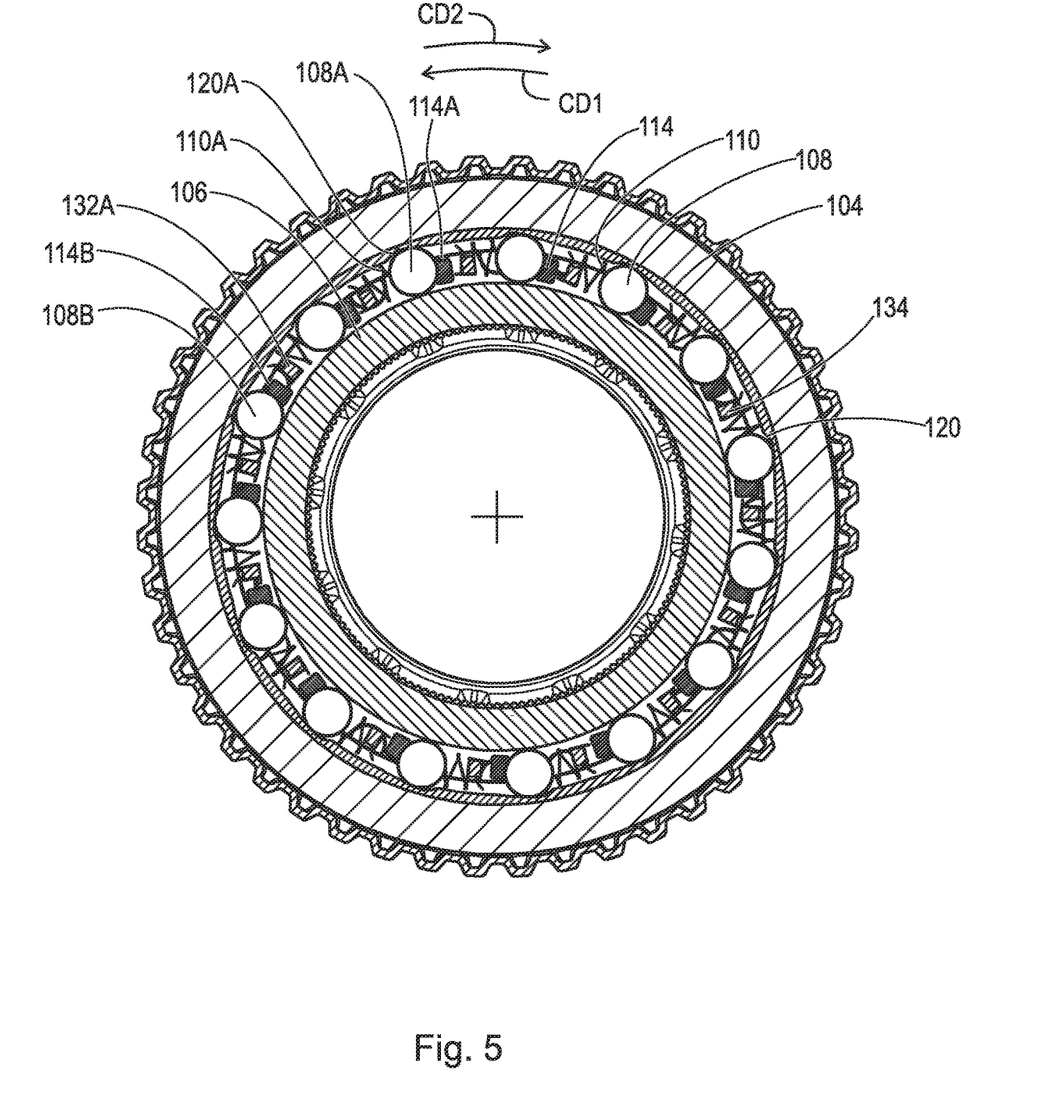
FIG. 5 is a cross-sectional view generally along line 5-5 in FIG. 1.

FIG. 5 is a cross-sectional view generally along line 5-5 in FIG. 1. The following should be viewed in light of FIGS. 1 through 5. Controllable one-way clutch 100 includes: axis of rotation AR; output assembly 102 including pocket ring 104; inner ring 106; rollers 108 radially disposed between inner ring 106 and pocket ring 104; springs 110 urging rollers 108 in circumferential direction CD1; switch ring 112 including switching protrusions 114; and actuator 116 engaged with switch ring 112. Each switching protrusions 114: extends in axial direction AD1; is in contact with a respective roller 108; and includes a respective ramp 118 in contact with pocket ring 104. For example, protrusion 114A is in contact with roller 108A and includes ramp 118A. In general, a reference character "[digit][digit][digit][letter]" designates a specific example of an element labeled as "[digit][digit][digit]." For example, ramp 118A is a specific example from among ramps 118.

In the example of FIG. 1, actuator 116 is a resilient element and clutch 100 includes actuator 119 connected to switch ring 112. Actuator 119 can be any actuator known in the art, including, but not limited to a mechanical, hydraulic, electric, pneumatic, or electro-mechanical actuator. In an example embodiment: actuator 116 is a resilient element and switch ring 112 is arranged to be connected to a mechanical, hydraulic, electric, pneumatic, or electro-mechanical actuator. That is, the mechanical, hydraulic, electric, pneumatic, or electro-mechanical actuator is not provided with clutch 100. In the figures for the instant application and in the discussion that follows, actuator 119 is shown and described. However, it should be understood that the discussion for actuator 119, included in clutch 100 is applicable to the mechanical, hydraulic, electric, pneumatic, or electro-mechanical actuator not provided with clutch 100. In the example of FIG. 1, actuator 119 is an electro-mechanical actuator, for example, an electrically energized solenoid.

In a one-way clutch configuration for one-way clutch 100: for a locked mode, inner ring 106 non-rotatably connects to pocket ring 104 for relative rotation of inner ring 106, with respect to pocket ring 104, in circumferential direction CD1; and for a free-wheel mode, inner ring 106 is rotatable with respect to pocket ring 104 in circumferential direction CD2, opposite circumferential direction CD1, or pocket ring 104 is rotatable with respect to inner ring 106 in circumferential direction CD1. By "relative rotation of inner ring 106, with respect to pocket ring 104, in circumferential direction CD1," we mean at least that: pocket ring 104 is rotationally fixed and inner ring 106 is rotating in circumferential direction CD1; or pocket ring 104 and inner ring 106 are both rotating in circumferential direction CD1, with inner ring 106 rotating faster than pocket ring 104; or pocket ring 104 is rotating in circumferential direction CD2 and inner ring 106 is rotating in circumferential direction CD1. By "non-rotatably connects," we mean that: at least one component connects to at least one other component so that whenever one of the components rotates, all the components rotate; and relative rotation between the components is not possible. Radial and/or axial movement of non-rotatably connected components with respect to each other is possible, but not required.

In an open configuration of one-way clutch 100: inner ring 106 is rotatable, with respect to pocket ring 104, in circumferential direction CD1 and in circumferential direction CD2; or pocket ring 104 is rotatable, with respect to inner ring 106, in circumferential direction CD1 and in circumferential direction CD2.

Figure 6:
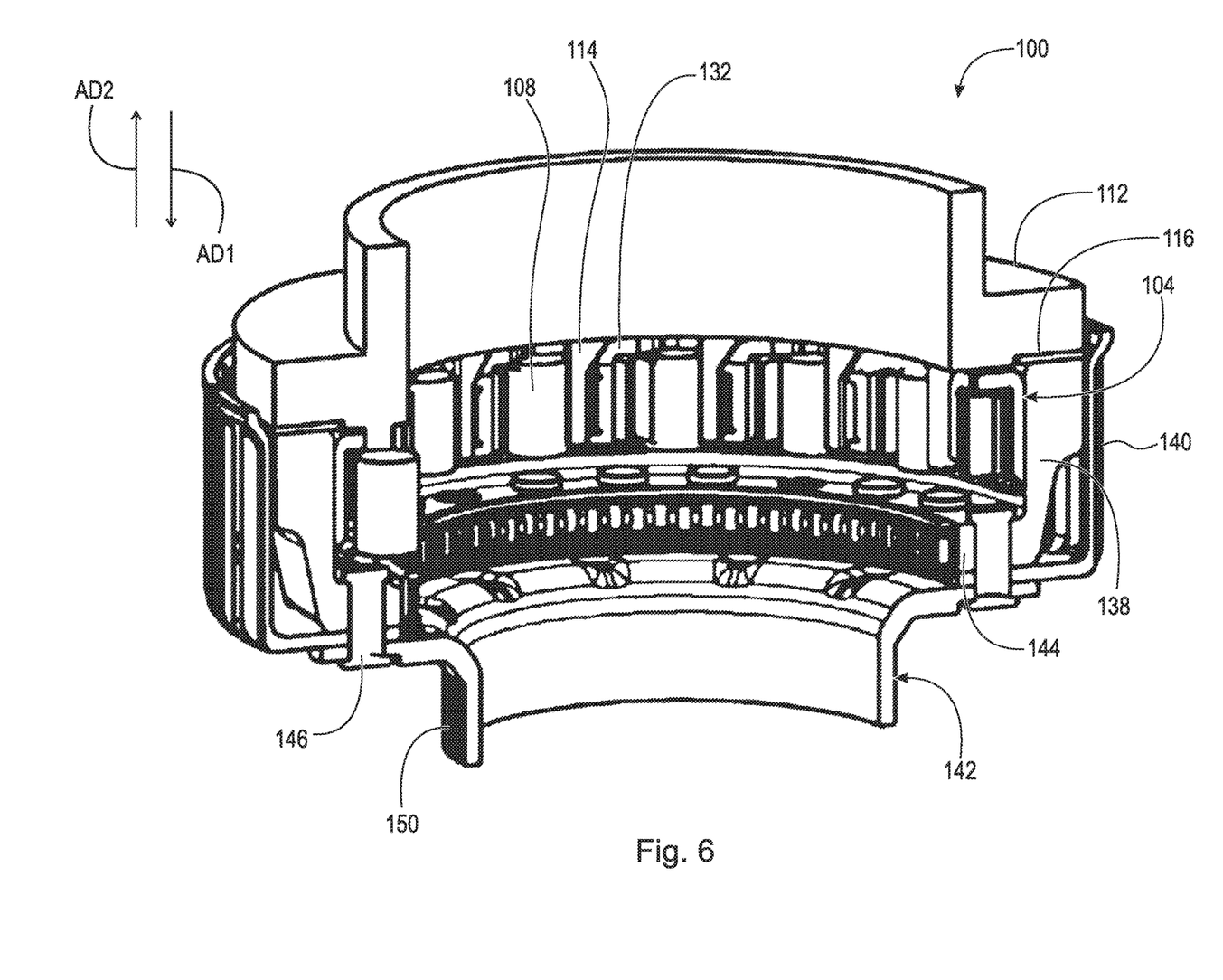
FIG. 6 is a perspective cross-sectional view of the controllable one-way clutch shown in FIG. 1 in an open configuration and with an inner ring and actuator removed for clarity.

FIG. 6 is a perspective cross-sectional view of controllable one-way clutch 100 shown in FIG. 1 in the open configuration and with inner ring 106 and actuator 119 removed for clarity.

Figure 7:
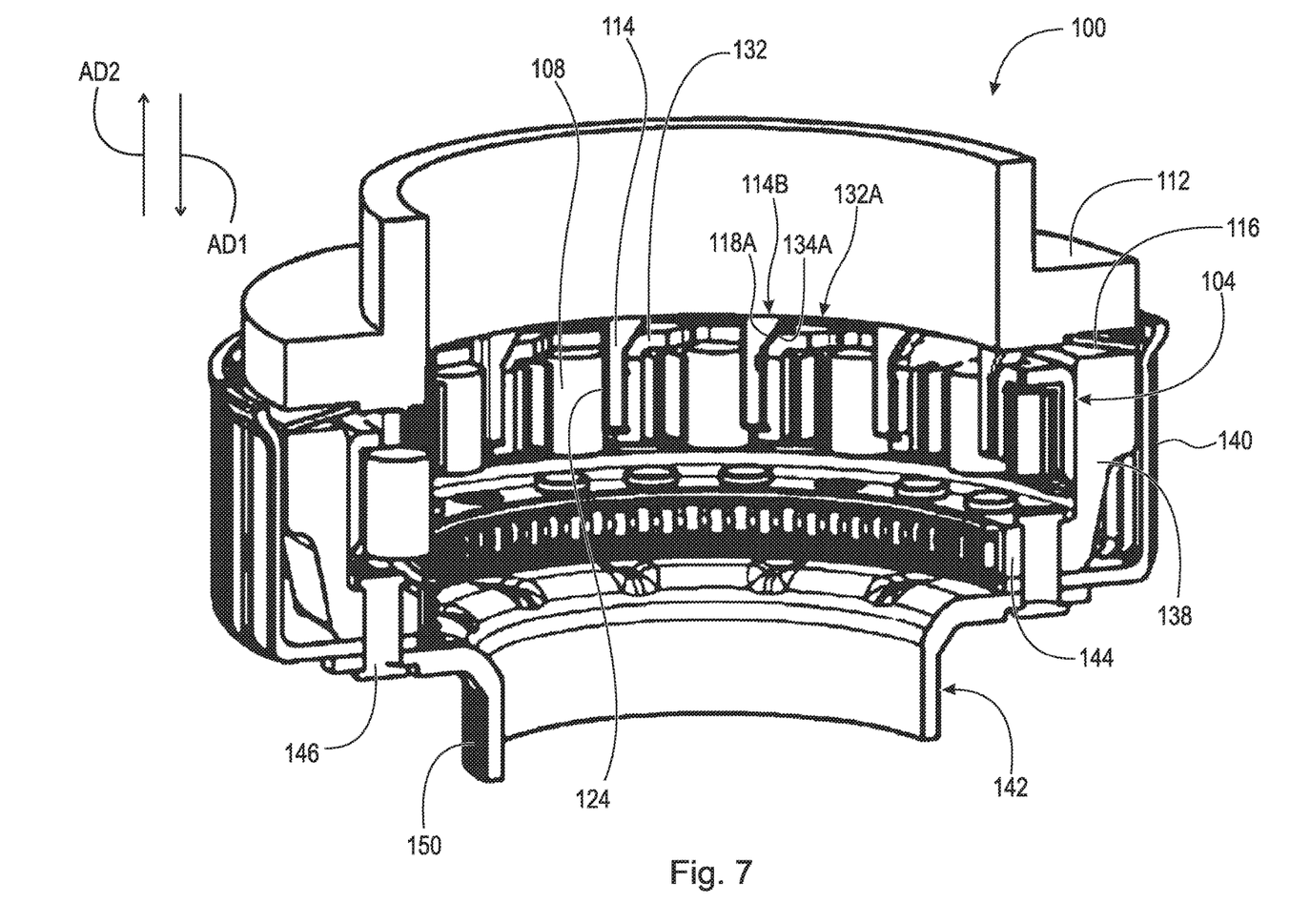
FIG. 7 is a perspective cross-section view of the controllable one-way clutch shown in FIG. 1 in a one-way clutch configuration and with the inner ring and the actuator removed for clarity; and, FIG. 8 is a perspective view of a cylindrical coordinate system demonstrating spatial terminology used in the present application.

FIG. 7 is a perspective cross-sectional view of controllable one-way clutch 100 shown in FIG. 1 in the one-way mode and with inner ring 106 and actuator 119 removed for clarity. The following should be viewed in light of FIGS. 1 through 7. In an example embodiment, actuator 116 urges switch ring 112 in axial direction AD1 with respect to pocket ring 104. That is, actuator 116 urges clutch 100 into the open configuration. To transition from the one-way clutch configuration to the open configuration: actuator 119 is de-activated; actuator 116 displaces switch ring 112 in axial direction AD1; the respective ramps 118 are arranged to slide along pocket ring 104 to rotate switch ring 112 in circumferential direction CD2; and switch ring 112, in particular protrusions 114, is arranged to displace rollers 108 radially outwardly and in circumferential direction CD2 to prevent or break a non-rotatable connection among inner ring 106, rollers 108, and pocket ring 104. To transition from the open configuration to the one-way clutch configuration: actuator 119 is activated; actuator 119 displaces switch ring 112 in axial direction AD2 against the urging of actuator 116 in direction AD1; ramps 118 are arranged to slide along pocket ring 104; and switch ring 112 is arranged to rotate in circumferential direction CD1.

In an example embodiment, actuator 116 urges switch ring 112 in axial direction ADZ with respect to pocket ring 104. That is, actuator 116 urges clutch 100 into the one-way clutch configuration. To transition from the one-way clutch configuration to the open configuration: actuator 119 is activated; actuator 119 displaces switch ring 112 in axial direction AD1 against the urging of actuator 116, as a resilient element, in direction AD2; the respective ramps 118 are arranged to slide along pocket ring 104 to rotate switch ring 112 in circumferential direction CD2; and switch ring 112, in particular protrusions 114, is arranged to displace rollers 108 radially inwardly and in circumferential direction CD2 to prevent or break a non-rotatable connection among inner ring 106, rollers 108, and pocket ring 104. To transition from the open configuration the one-way clutch configuration: actuator 119 is de-activated; actuator 116 displaces switch ring 112 in axial direction AD2; ramps 118 are arranged to slide along pocket ring 104; and switch ring 112 is arranged to rotate in circumferential direction CD1.

Pocket ring 104 includes ramps 120. Each roller 108 is in contact with a respective ramp 120. For example, roller 108A is in contact with ramp 120A. To transition from the open mode to the locked mode: springs 110 are arranged to displace, along ramps 120, rollers 108 radially inwardly and in circumferential direction CD1; and rollers 108 are arranged to non-rotatably connect to inner ring 106 and pocket ring 104. To transition from the open mode to the free-wheel mode, inner ring 106 or pocket ring 104 is arranged to displace, along ramps 120, rollers 108 radially outwardly and in circumferential direction CD2.

In an example embodiment: switch ring 112 includes annular body portion 122; switching protrusions 114 extend from annular body portion 122 in axial direction AD1; each protrusion 114 includes a surface 124 and a surface 126. Surface 124: faces in circumferential direction CD2; and is in contact with the respective roller 108. For example, surface 124A is in contact with roller 108A. Surface 126 includes ramp 118. Ramps 118 slope from annular body portion 122 in axial direction AD1 and circumferential direction CD2. In an example embodiment, portion 128 of surface 124 is located further, in axial direction AD1, from annular body portion 122 than ramps 118.

In an example embodiment, pocket ring 104 includes annular body portion 130 and switching protrusions 132 extending, from body portion 130, radially inwardly and in axial direction AD1; and each switching protrusion 132 is in contact with a respective switching protrusion 114. In the open configuration, each switching protrusion 132 is in contact with a respective ramp 118 for a respective switching protrusion 114. In an example embodiment, each switching protrusion 132 includes rounded portion 134 in contact with the respective ramp 118 in the open configuration. For example, portion 134A of protrusion 132A is in contact with ramp 118A of protrusions 114B. In an example embodiment in the one-way clutch configuration, distal portion 136 of each switching protrusion 132 is in contact with the respective switching protrusion 114. Each switching protrusion 114 is circumferentially disposed between a respective roller 108 and a respective switching protrusion 132. For example, protrusion 114C is circumferentially disposed between roller 108B and switching protrusion 132B.

In an example embodiment, output assembly 102 includes: outer race 138; housing 140; hub 142; and bearing 144. Pocket ring 104 is non-rotatably connected to outer race 138. Outer race 138, housing 140, and hub 142 are non-rotatably connected, for example by rivets 146. Inner ring 106 is arranged to non-rotatably connect to a shaft, for example via splines 148. Hub 142 is arranged to non-rotatably connect to a shaft, for example via splines 150. In an example embodiment, inner ring 106 is arranged to receive rotational torque from a shaft non-rotatably connected to inner ring 106. In an example embodiment, hub 142 is arranged to receive rotational torque from a shaft non-rotatably connected to hub 142.

One-way clutch 100 provides a readily selectable open configuration in addition to a one-way clutch configuration with a locked mode and a free-wheel mode. In the open configuration, inner ring 106 and pocket ring 104 are not rotatably connected and clutch 100 can free-wheel in directions CD1 and CD2. Further, clutch 100 uses a compact design to implement the selectable open configuration. For example, actuator 116, as a resilient element, occupies nominal space in clutch 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation

AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
100 controllable one-way clutch
102 output assembly
104 pocket ring
106 inner ring
108 roller
108A roller
108B roller
110 spring
110A spring
112 switch ring
114 switching protrusion, switch ring
114A switching protrusion, switch ring
114B switching protrusion, switch ring
114C switching protrusion, switch ring
116 actuator
118 ramp, switching protrusion 114
118A ramp, switching protrusion 114
119 actuator
120 ramp, pocket ring
120A ramp, pocket ring
122 annular body portion, switch ring
124 surface, switching protrusion 114
126 surface, switching protrusion 114
128 portion, surface 124
130 annular body portion, pocket ring
132 switching protrusion, pocket ring
132A switching protrusion, pocket ring
134 rounded portion, switching protrusion 132
134A rounded portion, switching protrusion 132
136 distal portion, switching protrusion 132
138 outer race
140 housing
142 hub

The invention claimed is:

1. A one-way clutch, comprising:
an axis of rotation;
a pocket ring;
an inner ring;
a plurality of rollers radially disposed between the inner ring and the pocket ring;
a plurality of springs urging the plurality of rollers in a first circumferential direction;
a switch ring including a plurality of axially extending switching protrusions, each axially extending switching protrusion:
in contact with a respective roller; and,
including a respective first ramp in contact with the pocket ring; and,
a first actuator, wherein:
in a one-way clutch configuration of the one-way clutch:
for a locked mode, the inner ring non-rotatably connects to the pocket ring for relative rotation of the inner ring, with respect to the pocket ring, only in the first circumferential direction; and,
for a free-wheel mode:
the inner ring is rotatable with respect to the pocket ring in a second circumferential direction, opposite the first circumferential direction; or,
the pocket ring is rotatable with respect to the inner ring in the first circumferential direction;
in an open configuration of the one-way clutch:
the inner ring is rotatable, with respect to the pocket ring, in the first circumferential direction and in the second circumferential direction; or,
the pocket ring is rotatable, with respect to the inner ring, in the first circumferential direction and in the second circumferential direction; and,
to transition from the one-way clutch configuration to the open configuration:
the first actuator is arranged to axially displace the switch ring with respect to the pocket ring;
the respective first ramps are arranged to slide along the pocket ring to rotate the switch ring in the second circumferential direction; and,
the plurality of axially extending switching protrusions is arranged to displace the plurality of rollers in the second circumferential direction.

2. The one-way clutch of claim 1, further comprising:
a second actuator, wherein:
to transition from the one-way clutch configuration to the open configuration, the first actuator is arranged to displace the switch ring, with respect to the pocket ring, in a first axial direction; and,
to transition from the open configuration to the one-way clutch configuration, the second actuator is arranged to displace the switch ring, with respect to the pocket ring, in a second axial direction opposite the first axial direction.

3. The one-way clutch of claim 1, wherein:
the pocket ring includes a plurality of second ramps;
each roller is in contact with a respective second ramp;
to transition from the open configuration to the locked mode:
the plurality of springs is arranged to displace, along the plurality of second ramps, the plurality of rollers radially inwardly and in the first circumferential direction; and,
the plurality of rollers is arranged to non-rotatably connect to the inner ring and the pocket ring; and
to transition from the open configuration to the free-wheel mode, the inner ring or the pocket ring is arranged to displace, along the plurality of second ramps, the plurality of rollers radially outwardly and in the second circumferential direction.

4. The one-way clutch of claim 1, wherein to transition from the one-way clutch configuration to the open configuration, the plurality of axially extending switching protrusions is arranged to displace the plurality of rollers radially outwardly.

5. The one-way clutch of claim 1, wherein:
the switch ring includes an annular body portion;

the plurality of axially extending switching protrusions extends from the annular body portion in a first axial direction;
said each axially extending switching protrusion includes:
a first surface:
facing in the second circumferential direction; and,
in contact with the respective roller; and,
a second surface including the respective first ramp; and,
the respective first ramp slopes, from the annular body portion, in the first axial direction and in the second circumferential direction.

6. The one-way clutch of claim 5, wherein at least a portion of the first surface is located further, in the first axial direction, from the annular body portion than the respective first ramp.

7. The one-way clutch of claim 5, wherein:
the pocket ring includes:
an annular body portion; and,
a plurality of first switching protrusions extending, with respect to the annular body portion of the pocket ring, radially inwardly and in a second axial direction, opposite the first axial direction; and,
each first switching protrusion is in contact with a respective axially extending switching protrusion.

8. The one-way clutch of claim 7, wherein said each first switching protrusion is in contact with the respective first ramp for the respective axially extending switching protrusion.

9. The one-way clutch of claim 7, wherein:
said each first switching protrusion includes a rounded portion in contact with the respective first ramp.

10. The one-way clutch of claim 7, wherein said each axially extending switching protrusion is circumferentially disposed between the respective roller and a respective first switching protrusion.

11. The one-way clutch of claim 1, further comprising:
a second actuator, wherein:
to transition from the open configuration to the one-way clutch configuration, the second actuator is arranged to axially displace the switch ring with respect to the pocket ring; and,
the first actuator is a resilient element and the second actuator is a mechanical, hydraulic, electric, pneumatic, or electro-mechanical actuator; or,
the second actuator is a resilient element and the first actuator is a mechanical, hydraulic, electric, pneumatic, or electro-mechanical actuator.

12. The one-way clutch of claim 11, wherein:
the plurality of axially extending switching protrusions extend from the switch ring in a first axial direction;
the first actuator:
is the resilient element; and,
is arranged to displace the switch ring in the first axial direction; and,
the second actuator:
is the mechanical, hydraulic, electric, pneumatic, or electro-mechanical actuator; and,
is arranged to displace the switch ring in a second axial direction, opposite the first axial direction.

13. The one-way clutch of claim 11, wherein:
the plurality of axially extending switching protrusions extend from the switch ring in a first axial direction;
the first actuator:
is the mechanical, hydraulic, electric, pneumatic, or electro-mechanical actuator; and,
is arranged to displace the switch ring in the first axial direction; and,
the second actuator:
is the resilient element; and,
is arranged to displace the switch ring in a second axial direction, opposite the first axial direction.

14. A one-way clutch, comprising:
an axis of rotation;
a pocket ring;
an inner ring;
a plurality of rollers radially disposed between the inner ring and the pocket ring;
a plurality of springs urging the plurality of rollers in a first circumferential direction;
a switch ring including a plurality of first switching protrusions extending in a first axial direction, each first switching protrusion:
in contact with a respective roller; and,
including a respective first ramp in contact with the pocket ring;
a first actuator; and,
a second actuator, wherein:
in a one-way clutch configuration of the one-way clutch:
for a locked mode, the inner ring non-rotatably connects to the pocket ring for relative rotation of the inner ring, with respect to the pocket ring, only in the first circumferential direction; and,
for a free-wheel mode:
the inner ring is rotatable with respect to the pocket ring in a second circumferential direction, opposite the first circumferential direction; or,
the pocket ring is rotatable with respect to the inner ring in the first circumferential direction;
in an open configuration of the one-way clutch:
the inner ring is rotatable, with respect to the pocket ring, in the first circumferential direction and in the second circumferential direction; or,
the pocket ring is rotatable, with respect to the inner ring, in the first circumferential direction and in the second circumferential direction;
to transition from the one-way clutch configuration to the open configuration:
the first actuator is arranged to displace the switch ring, with respect to the pocket ring, in the first axial direction;
the respective first ramps are arranged to slide along the pocket ring to rotate the switch ring in the second circumferential direction; and,
the plurality of axially extending switching protrusions is arranged to displace the plurality of rollers in the second circumferential direction; and,
to transition from the open configuration to the one-way clutch configuration, the second actuator is arranged to displace the switch ring, with respect to the pocket ring, in a second axial direction opposite the first axial direction.

15. The one-way clutch of claim 14, wherein:
the first actuator is a resilient element and the second actuator is a mechanical, hydraulic, electric, pneumatic, or electro-mechanical actuator; or,
the second actuator is a resilient element and the first actuator is a mechanical, hydraulic, electric, pneumatic, or electro-mechanical actuator.

16. The one-way clutch of claim 14, wherein:
said each first switching protrusion includes:

a first surface:
  facing in the second circumferential direction; and,
  in contact with the respective roller; and,
a second surface including the respective first ramp; and,
the respective first ramp slopes in the first axial direction and in the second circumferential direction.

17. The one-way clutch of claim 14, wherein:
the pocket ring includes a plurality of second ramps;
each roller is in contact with a respective second ramp;
to transition from the open configuration to the locked mode:
  the plurality of springs is arranged to displace, along the plurality of second ramps, the plurality of rollers radially inwardly and in the first circumferential direction; and,
  the plurality of rollers is arranged to non-rotatably connect to the inner ring and the pocket ring; and
to transition from the open configuration to the free-wheel mode, the inner ring or the pocket ring is arranged to displace, along the plurality of second ramps, the plurality of rollers radially outwardly and in the second circumferential direction.

18. A one-way clutch, comprising:
an axis of rotation;
a pocket ring;
an inner ring;
a plurality of rollers radially disposed between the inner ring and the pocket ring;
a plurality of springs urging the plurality of rollers in a first circumferential direction;
a switch ring including a plurality of first switching protrusions extending in a first axial direction, each first switching protrusion:
  in contact with a respective roller; and,
  including a respective first ramp in contact with the pocket ring;
a resilient element; and,
an electromagnetic actuator, wherein:
  in a one-way clutch configuration of the one-way clutch:
    for a locked mode, the inner ring non-rotatably connects to the pocket ring for relative rotation of the inner ring, with respect to the pocket ring, only in the first circumferential direction; and,
    for a free-wheel mode:
      the inner ring is rotatable with respect to the pocket ring in a second circumferential direction, opposite the first circumferential direction; or,
      the pocket ring is rotatable with respect to the inner ring in the first circumferential direction;
  in an open configuration of the one-way clutch:
    the inner ring is rotatable, with respect to the pocket ring, in the first circumferential direction and in the second circumferential direction; or,
    the pocket ring is rotatable, with respect to the inner ring, in the first circumferential direction and in the second circumferential direction;
  to transition from the one-way clutch configuration to the open configuration:
    the electromagnetic actuator is arranged to displace the switch ring, with respect to the pocket ring, in the first axial direction;
    the respective first ramps are arranged to slide along the pocket ring to rotate the switch ring in the second circumferential direction; and,
    the plurality of first switching protrusions is arranged to displace the plurality of rollers in the second circumferential direction; and,
  to transition from the open configuration to the one-way clutch configuration the resilient element is arranged to displace the switch ring, with respect to the pocket ring, in a second axial direction opposite the first axial direction.

19. The one-way clutch of claim 18, wherein:
the pocket ring includes a plurality of second switching protrusions extending in the first axial direction; and,
to transition from the one-way clutch configuration to the open configuration the respective first ramps are arranged to slide along the plurality of second switching protrusions.

20. The one-way clutch of claim 19, wherein:
each second switching protrusion includes a rounded portion in contact with the respective first ramp; and,
each first switching protrusion is circumferentially disposed between the respective roller and a respective second switching protrusion.

\* \* \* \* \*